US000001872H

United States Statutory Invention Registration [19]

[11] Reg. Number: H1,872

Bowman

[45] Published: Oct. 3, 2000

[54] MODULAR FIBER REINFORCED PLASTIC ENCLOSED BRIDGE

[75] Inventor: Keith B. Bowman, Casstown, Ohio

[73] Assignee: The United States of America as represented by the Secretary of the Air Force, Washington, D.C.

[21] Appl. No.: 09/034,114

[22] Filed: Mar. 3, 1998

Related U.S. Application Data

[60] Provisional application No. 60/039,759, Mar. 3, 1997.

[51] Int. Cl.[7] ..... B31C 13/00; B65H 81/00

[52] U.S. Cl. ..... 156/172; 156/169; 156/173; 156/175

[58] Field of Search ..... 156/169, 172, 156/173, 175; 14/77.1; 52/745.19, 745.2, 309.1, 88

[56] References Cited

U.S. PATENT DOCUMENTS

| | | | |
|---|---|---|---|
| 3,931,095 | 1/1976 | Kondo et al. . | |
| 5,108,810 | 4/1992 | Williams | 428/36.1 |
| 5,362,344 | 11/1994 | Ben-Porat et al. | 156/175 X |
| 5,362,345 | 11/1994 | Stettler et al. | 156/169 X |
| 5,632,940 | 5/1997 | Whatley | 156/175 X |
| 5,669,999 | 9/1997 | Anderegg et al. | 156/173 |

FOREIGN PATENT DOCUMENTS

| | | | |
|---|---|---|---|
| 1490575 | 11/1977 | United Kingdom | 156/172 |
| 9603271 | 2/1996 | WIPO | 156/175 |

*Primary Examiner*—Harold J. Tudor
*Attorney, Agent, or Firm*—Bobby D. Scearce; Thomas L. Kundert

[57] ABSTRACT

A method for fabricating a fiber reinforced composite bridge module is described which in one preferred embodiment includes the steps of selecting a cross-sectional shape for the bridge module defined by an outer substantially tubular shell having a top side and a bottom side, and a floor deck near the bottom side and at least one keel beam beneath the floor deck and extending lengthwise of the outer shell, the outer shell, floor deck and keel beams defining a plurality of passageways along the length of the module, winding fiber and impregnating material on mandrels in a plurality tubular sections defining the plurality of passageways, joining the plurality of tubular sections in side-by-side relationship in an assembly substantially defining in cross section the cross-sectional shape of the module, winding fiber and impregnating material around the assembly to a preselected thickness for the outer shell; and curing the fiber and impregnating material.

12 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

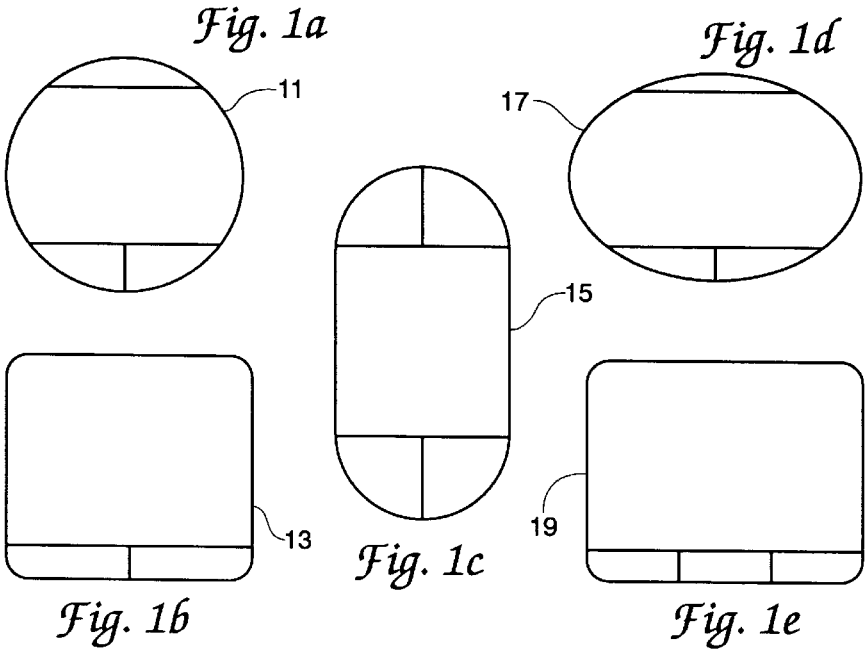
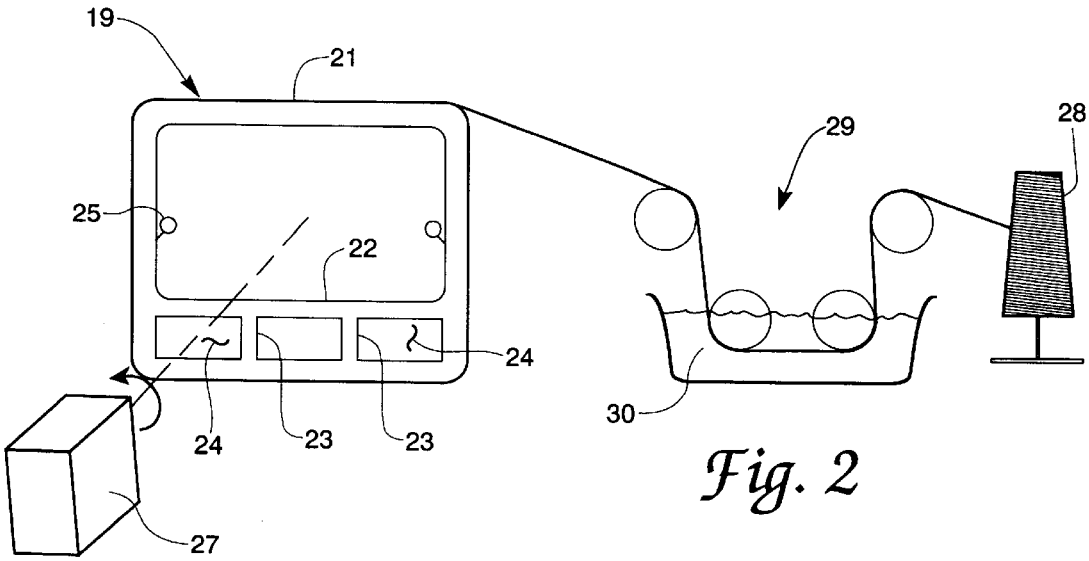
Fig. 2

MODULAR FIBER REINFORCED PLASTIC ENCLOSED BRIDGE

This application claims the benefit of U.S. Provisional No. 60/039,759 filed Mar. 3, 1997.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to structure and manufacture of modular bridges, and more particularly to modular bridge structures comprising fiber reinforced plastic (FRP) composite.

Conventional pedestrian bridges have typically been fabricated of steel, concrete, and wood. Some composite bridge structures have been proposed but use truss designs in which pultruded composite members are linked together so that each member takes compression or tension similarly to comparable steel construction. Certain composite vehicular bridge structures utilize non-winding fabrication techniques, each structure consisting of many individual parts all adhered or fastened together, which is very labor intensive during the fabrication phase. One such structure requires that truss-built sides be transported to the site and connected with composite members that comprise the floor deck. The bridge is built on site using standard assembly techniques, which may be satisfactory for standard building materials, but is marginal for composites. Because the structures can be fabricated only in part at a factory and must be assembled at the bridge site, substantial disruption of traffic flow may result. Assembly techniques for the structures use mechanical fasteners which create points of stress concentration.

The invention described herein solves or substantially reduces in critical importance problems with previously existing bridge structures and fabrication methods by providing an enclosed FRP composite bridge structure that exploits the high specific strength and stiffness of FRP materials, has low fabrication costs, omits nonstructural wall and roof members that add unnecessary weight, has a minimum number of mechanical fasteners and fewer sites for structural failure, is fabricated in modules with various cross sectional configurations, can be factory fabricated and assembled, thereby avoiding site weather conditions that hamper installation or compromise tolerances, and can be transported to the site completely assembled or in modules and installed with minimal disruption of traffic flow.

It is therefore a principal object of the invention to provide an FRP bridge structure and fabrication method.

It is a further object of the invention to provide an inexpensive, strong, lightweight and corrosion resistant bridge structure.

It is yet another object of the invention to provide an FRP bridge structure that can be fabricated in modular form and assembled to a desired length.

It is another object of the invention to provide a factory fabricated and assembled bridge structure for installation at a bridge site with minimal interruption of traffic flow.

It is yet another object of the invention to provide a bridge structure requiring substantially lower maintenance during bridge lifetime as compared to previously existing bridge structures.

These and other objects of the invention will become apparent as a detailed description of representative embodiments proceeds.

SUMMARY OF THE INVENTION

In accordance with the foregoing principles and objects of the invention, a method for fabricating a fiber reinforced composite bridge module is described which in one preferred embodiment includes the steps of selecting a cross-sectional shape for the bridge module defined by an outer substantially tubular shell having a top side and a bottom side, and a floor deck near the bottom side and at least one keel beam beneath the floor deck and extending lengthwise of the outer shell, the outer shell, floor deck and keel beams defining a plurality of passageways along the length of the module, winding fiber and impregnating material on mandrels in a plurality tubular sections defining the plurality of passageways, joining the plurality of tubular sections in side-by-side relationship in an assembly substantially defining in cross section the cross-sectional shape of the module, winding fiber and impregnating material around the assembly to a preselected thickness for the outer shell, and curing the fiber and impregnating material.

DESCRIPTION OF THE DRAWINGS

FIGS. 1*a*–1*e* show representative cross sections of bridge structures illustrative of the invention;

FIG. 2 shows the representative bridge cross section of FIG. 1*e* in illustration of typical fabrication steps for bridge structures according to the invention;

DETAILED DESCRIPTION

Figure 3A:
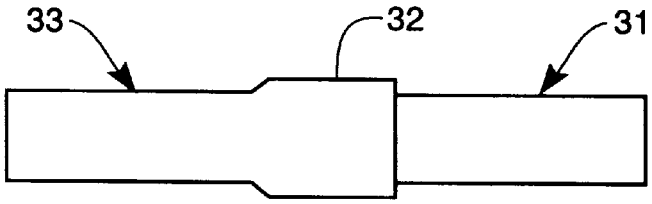
FIGS. 3*a* and 3*b* show two representative joint configurations for the FIG 1*a*–*e* structures.

Referring now to the drawings, FIGS. 1*a*–*e* show representative cross sections of substantially axisymmetric bridge structures 11, 13, 15, 17, 19 illustrative of the invention. FIG. 2 shows the representative bridge cross section of FIG. 1*e* in illustration of typical fabrication steps for bridge structures according to the invention. As suggested in FIGS. 1*a*–1*e*, the cross section of the bridge structure may be substantially round or oval in shape (FIGS. 1*a*, 1*d*) or rectangular in shape (FIGS. 1*b*, 1*e*), or a combined shape (FIG. 1*c*). A bridge structure of the invention may have any suitable cross section, the invention not considered limited by the representative shapes shown in FIGS. 1*a*–1*e*, although the selected shape should be amenable to fabrication by winding methods appropriate for composite fabrication suggested below. The structures may have diameters or widths in the range of about 8 to 15 feet, and may be fabricated in modular sections of lengths limited only by the fabrication method and winding facility used for fabrication. Typical maximum modular lengths may be 60 to 70 feet. As is discussed in more detail below in relation to suggested fabrication and assembly methods, multiple modular sections may be joined together to achieve a longer span.

Referring now specifically to FIG. 2, the structures of the invention may preferably comprise an outer substantially tubular shaped modular shell 21, a floor deck 22, and one or more keel beams 23 extending lengthwise of structure 19. Keel beams 23 lend substantial lengthwise (axial) bending and buckling strength to structure 19. A ceiling panel (not shown in FIG. 2, but see, e.g., FIGS. 1*a*, 1*c*, 1*d*) may also be included if desired. The channels 24 extending lengthwise of structure 19 thus defined by the lower side of outer shell 21, deck 22 and beams 23 may be conveniently used to enclose heating, electrical, ventilation and air conditioning and other utilities. Likewise, the space above any ceiling panel may be used to enclose lighting, electrical or other services. The space in the ceiling area as well as the space defined by deck 22 and the lower portion of outer shell 21 may be filled with rigid foam, honeycomb, or balsa wood material to enhance rigidity to the deck and ceiling should heating and electrical utilities not be required. Handrails 25 may be attached to the interior of structure 19 using mechanical fasteners or adhesives.

Structure 19 may be fabricated utilizing filament winding or tow placement (the term "winding" herein refers to filament winding, tow placement or other method that yields an enclosed shape). FIG. 2 shows schematically a system for filament winding a structure such as structure 19. The system includes filament winding machine 27, a source 28 of filament or tow, and means 29 for applying impregnating material 30 to the filament or tow. In the winding operation, structure 19 may be wound on a suitable mandrel comprising an element of winding machine 27 at selected filament winding speed and winding angle relative to the axial direction of structure 19 by drawing filament or tow 32 from source 28 through impregnating material 30 and onto the wound structure on the mandrel. In filament winding, the fiber and/or tows are held under constant tangential tension during winding. In tow placement, the tows are applied under radial pressure, resulting in tight material consolidation. The resulting wound structure 19 may then be cured, and necessary finishing operations performed on the structure.

It is noted that the wound structure (such as 19) may be fabricated in alternative ways. First, outer modular shell 21 may be wound to any desired finished thickness consistent with anticipated load levels to be carried by the bridge. Floor deck 22 and keel beams 23 are attached within shell 21 by mechanical or adhesive means. Alternatively, the structure may be fabricated by winding the structure in sections and assembling the sections to form the finished structure. In this procedure, a number of separate sections defined by, for example, outer shell 21 and deck 22, and sections defined by deck 22, the lower surface of shell 21 and keel beams 23 may be separately wound to partial finished thickness, assembled together by mechanical or adhesive means, and the assembly wound to finished thickness as suggested in FIG. 2. In either structure, the resulting skin could either be monolithic FRP or a sandwich of FRP and core material.

Typical filament materials include carbon, graphite, boron, KEVLAR (an aromatic polyamide), glass, aluminum or others as would occur to the skilled artisan practicing the invention. The filaments may be impregnated with suitable materials such as any thermosetting polymers, thermoplastic polymers, polyimide materials or combinations thereof to form the desired FRP. The structure may be made substantially fire retardant by using glass, carbon or graphite fibers in phenolic polyimide or furan impregnating material, or other combinations as would occur to the skilled artisan guided by these teachings. Structural rigidity could be enhanced through the use of sandwich core material such as aluminum or polymeric honeycomb, polymeric foams, carbon foams, plywood or balsa wood.

Other composite fabrication methods may be applicable to the invention as would occur to the skilled artisan guided by these teachings, such as hand lay-up, pultrusion and vacuum assisted resin transfer molding (VARTM). Hand lay-up involves the placement of resin impregnated fabric or unidirectional tape onto a mold or tool, followed by heat treatment under pressure of the tool and plies of fabric to cure the FRP. In the pultrusion method, tows of fibers are pulled through a heated die of the desired product shape. In the VARTM method, dry fabric or fibers are placed onto a mold, the whole system is enclosed in a sealed bag, and a vacuum is pulled on the bagged part while resin is infused into the fibers or fabric of the part.

Windows may be incorporated into the bridge structure by cutting openings in the wound structure and attaching frames in the openings to transfer load and hold the windows in place, or by winding the structure around specially configured blank tooling inserts to define window openings and then attaching frames to hold the windows in place, or by using window material as the inserts and integrally winding the window into the structure. Load requirements on the finished structure primarily control the filament winding angle and the resulting window size, shape and placement.

Thermal insulation may be incorporated into the structure by applying a foam, honeycomb or other rigid insulative material during the winding process to produce a multilayered structure of winding and insulation. The interior walls of the structure may be coated with a fire retardant material or the structure may be wound using fire retardant FRP.

Figure 3B:
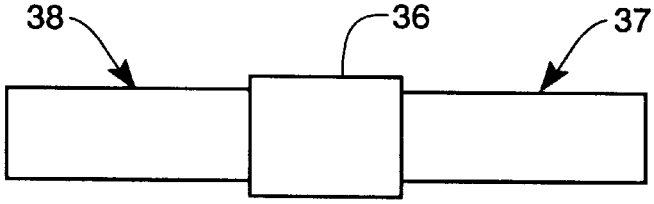

FIGS. 3*a* and 3*b* illustrate two ways of joining modules. One end of a module 31 may be inserted into a flared end 32 of an axially adjacent module 33, or a prefabricated coupling 36 may be slipped over the ends of two abutting modules 37,38. Both methods provide a strong stable joint when adhesive is applied to the joint region before connection. The distance coupling 36 over laps each module 37,38 is preferably at least one-half the diameter of each module. The distance the flared end 32 should slip over module 31 is preferably at least one-half the diameter of module 31.

Multiple modules can be joined at the site by placing the modules and couplings in-line with each other, applying adhesive to the inside of the couplings, and then sliding the modules and coupling together.

Figure 4:
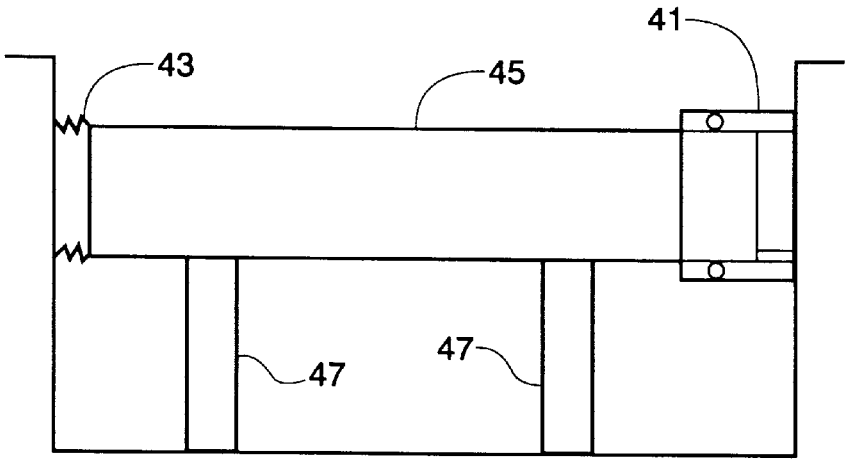
FIG. 4 shows a side view in section of a bridge of the invention with representative transitioning structure to buildings.

Referring now to FIG. 4, a collar coupling 41 or flexible bellows coupling 43 may be used to transition between buildings and a modular bridge structure 45 and suitable supports such as columns 47 may be used to provide any needed support between the ends of structure 45. In the case of use of collar coupling 41, first inserted onto structure 45, and, once the module (structure 45) is in place, the collar is slid against the building or through the building opening for permanent sealing attachment utilizing attachment means well known in the building art. Sealants may be used to create a water tight coupling at the collar module end while not inhibiting expansion movements.

Figure 5A:
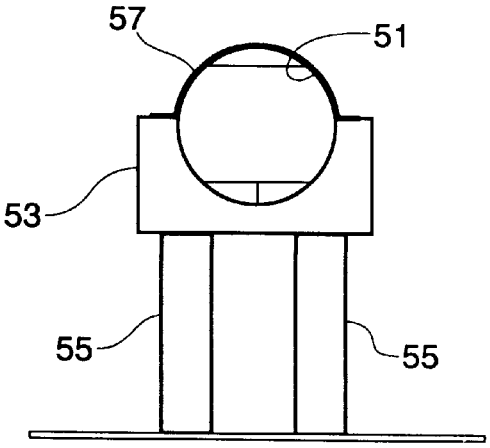
FIGS. 5*a* and 5*b* illustrate in cross-section two representative column support and saddle structures for anchoring a representative bridge of the invention.
Figure 5B:
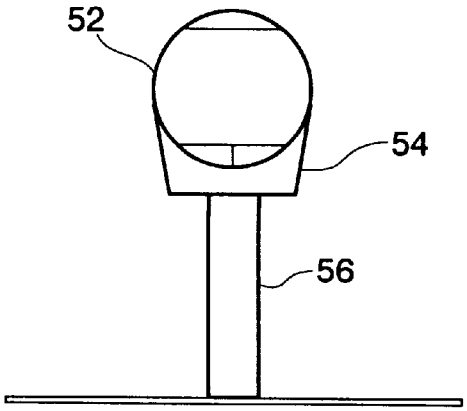

FIGS. 5*a* and 5*b* show representative module support arrangements for a bridge structure of the invention. Structures 51,52 are supported in respective saddles 53,54 on one or more columns 55,56. As suggested in FIG. 5*b,* saddle 54 may be an integral part of structure 52. As shown in FIG. 5*a,* an optional strap 57 may be used to secure the structure on the saddle. Saddles 53,54 and columns 55,56 may be configured conventionally using suitable material (such as wood, concrete, FRP, or metal) selected to accommodate the bridge load and design and site peculiarities.

The invention therefore provides a fiber reinforced plastic bridge structure and fabrication method. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A method for fabricating a fiber reinforced composite bridge module, comprising the steps of:

(a) providing a source of fiber and a source of impregnating material;

(b) selecting a cross-sectional shape for the bridge module defined by an outer substantially tubular shaped shell having a top side and a bottom side, and a floor deck near said bottom side, said outer shell and floor deck defining a plurality of passageways along the length of said module;

(c) winding on mandrels said fiber and impregnating material in a plurality tubular sections defining said plurality of passageways;

(d) joining said plurality of tubular sections in side-by-side relationship in an assembly substantially defining a cross section said cross-sectional shape of said module;

(e) winding said fiber and impregnating material around said assembly to a preselected thickness of said outer shell; and (f) curing said fiber and impregnating material.

2. The method of claim 1 wherein said module has a width up to about fifteen feet and a length of up to about seventy feet.

3. The method of claim 1 wherein said fiber comprises a material selected from the group consisting of carbon, graphite, boron, an aromatic polyamide, glass, and aluminum.

4. The method of claim 1 wherein said impregnating material is selected from the group consisting of thermosetting polymers, thermoplastic polymers, and polyimide material.

5. The method of claim 1 wherein said impregnating material is phenolic polyimide or furan.

6. The method of claim 1 further comprising the step of incorporating thermal insulation into said outer shell during the step of winding said fiber and impregnating material around said assembly to produce a multi-layered structure of winding and insulation in said outer shell.

7. A method for fabricating a fiber reinforced composite bridge module, comprising the steps of:

(a) providing a source of fiber and a source of impregnating material;

(b) selecting a cross-sectional shape for the bridge module defined by an outer substantially tubular shaped shell having a top side and a bottom side, and a floor deck near said bottom side;

(c) winding said fiber and impregnating material to separately form said outer shell and said floor deck;

(d) curing said fiber and impregnating material in each of said outer shell and floor deck; and (e) joining said outer shell and floor deck in an assembly defining in cross section said cross-sectional shape of said module.

8. The method of claim 7 wherein said module has a width up to about fifteen feet and a length of up to about seventy feet.

9. The method of claim 7 wherein said fiber comprises a material selected from the group consisting of carbon, graphite, boron, an aromatic polyamide, glass, and aluminum.

10. The method of claim 7 wherein said impregnating material is a thermosetting resin.

11. The method of claim 7 wherein said impregnating material is phenolic polyimide or furan.

12. The method of claim 7 further comprising the step of incorporating thermal insulation into said outer shell during the step of winding said fiber and impregnating material to form said outer shell to produce a multi-layered structure of winding and insulation in said outer shell.

* * * * *